Patented Oct. 24, 1950

2,527,421

UNITED STATES PATENT OFFICE 2,527,421

3,4-DICARBOXY-2-FURAN-ALKANOLS AND DERIVATIVES THEREOF

Klaus Hofmann, Pittsburgh, Pa., assignor to Ciba Pharmaceutical Products, Incorporated, Summit, N. J., a corporation of New Jersey No Drawing. Application June 20, 1947, Serial No. 756,096

8 Claims. (Cl. 260—345)

The present invention relates to new and useful 3,4-dicarboxy-2-furan-alkanols and esters thereof, and also to the corresponding tetrahydrofuran derivatives.

The present application is in part a continuation of copending application, Serial No. 511,610, filed November 24, 1943, now Patent 2,432,016, December 2, 1947, which, in turn, is in part a continuation of application, Serial No. 459,674 (now U. S. Patent No. 2,382,418), filed September 25, 1942, and the invention to which the present application relates involves further developments of the inventions described in the enumerated prior applications.

A primary object of the present invention is the preparation of new and particularly useful 3,4-dicarboxy-2-furan-alkanols of the general formula I. 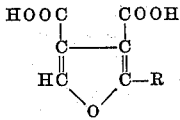

and of the corresponding tetrahydro compounds of the formula

Ia. 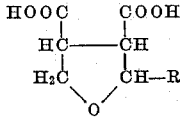

wherein R represents a lower alkanol group, with especial reference to those situations wherein R represents a butanol, i. e. —(CH₂)₃—CH₂OH, or a pentanol, i. e. —(CH₂)₄—CH₂OH group.

A further object of this invention is the preparation of new and useful derivatives of the aforesaid 3,4-dicarboxy-2-furan-alkanols and, more particularly, derivatives which contain the aforeindicated relatively complicated side chain in the 2-position, but wherein the carboxyl groups in the 3- and 4-positions are replaced by derivative groups, as will hereinafter more particularly appear.

According to the present invention, the aforedescribed furan derivatives may be prepared by reacting a 2-substituted furan derivative II with an acetylene-dicarboxylic acid ester to produce the complex intermediate III, which is then partially hydrogenated with the aid of a suitable catalyst to form the compound IV. The latter, on distillation, loses one molecule of ethylene, and forms the corresponding 2-substituted furandicarboxylic ester V which, by catalytic hydrogenation, may be converted into the corresponding saturated analogue VI.

This presently preferred procedure may be exemplified by the following:

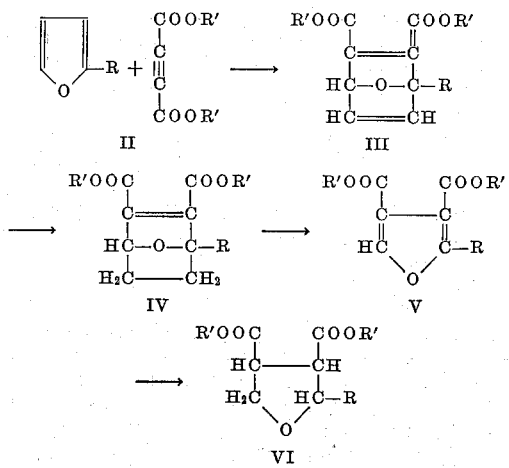

wherein R stands for a free or esterified lower alkanol group, and R' stands for H, alkyl, aryl or aralkyl. Suitable esters in this connection are aliphatic and aromatic esters such for example as the methyl, ethyl, propyl, phenyl and benzyl esters.

It is also possible to replace compound II in the foregoing reaction scheme by the corresponding tetrahydrofuran compound, whereby step V→VI is obviated. The side chain in the 2-position may be of the alkanol or ester type.

Suitable starting materials therefore are, on the one hand, the 2-substituted furans of formula II or the corresponding tetrahydrofurans (the variables being defined as in the preceding paragraph) and, on the other hand, esters of acetylene dicarboxylic acid, such as the methyl, ethyl, propyl, isopropyl, phenyl and benzyl esters.

For the partial reduction of the intermediate of the formula III the following catalysts may, for example, be used: metals of the platinum group such as platinum, palladium or others as such or on carriers, or nickel in the various forms used for such purpose. The catalytic reduction of the furan ring to the corresponding saturated compounds may be carried out under pressure and at temperatures between 20° to 250° C. with catalysts, as for example nickel in neutral solution or a metal of the platinum group in acid solution.

The new compounds are useful for the preparation of substances which are valuable for therapeutic purposes or as intermediates in the production of such substances.

The following examples illustrate methods of carrying out the present invention, but it is to be understood that the examples are given by way of illustration and not of limitation. The "parts by weight" bear the same relation to "parts by volume" as do grams to cubic centimeters.

*Example 1*

A mixture of 77.4 parts by weight of 2-furanpropanol and 105 parts by weight of diethyl acetylene dicarboxylate is heated on a steam-bath for twelve hours. The resulting addition compound is dissolved in 300 parts by volume of ethyl acetate and is hydrogenated in the presence of 14 parts by weight of a palladium-on-barium sulfate catalyst until one mol of hydrogen is absorbed. The catalyst is removed by filtration, the ethyl acetate removed in vacuo, and the residue decomposed in vacuo at 190–200° C. and 12 mm. pressure and then distilled; 119.6 parts by weight of 3,4-dicarbethoxy-2-furanpropanol is obtained as an oil which boils at 146–152° C. at 0.02 mm.

A solution of 119.6 parts by weight of the above 3,4-dicarbethoxy-2-furanpropanol in 710 parts by volume of methanol and 355 parts by volume of 5-normal potassium hydroxide is refluxed for five hours, after which the methanol is removed in vacuo. The residue is diluted with water, acidified with concentrated hydrochloric acid, and the resulting crystals collected, washed with water, and dried over phosphorus pentoxide in vacuo. The 3,4-dicarboxy-2-furanpropanol, 90.1 parts by weight is recrystallized from a mixture of ethyl acetate and methanol and melts at 161–162° C.

A mixture of 61.5 parts by weight of the above 3,4-dicarboxy-2-furanpropanol in 255 parts by volume of dry pyridine and 148 parts by volume of acetic anhydride is heated on a steam-bath until all of the solid is dissolved, and the resulting solution is kept at room temperature for twelve hours. The solvents are removed in vacuo, the residue is acidified to Congo red with concentrated hydrochloric acid, and the crude acetate is extracted with ethyl acetate. The material is purified by re-extraction with 10% sodium bicarbonate and acidification; 62.8 parts by weight of the acetate, melting at 70–72° C., are obtained.

By replacing the acetic anhydride of the preceding paragraph by other suitable acylating agents, such for example as propionic acid anhydride, butyric anhydride, acetyl chloride, propionyl chloride, butyryl chloride, benzoyl chloride, etc., the corresponding esters may be obtained in analogous manner.

*Example 2*

Fifty parts by weight of 2-furanbutanol and 67 parts by weight of diethyl acetylene dicarboxylate are heated on the steam-bath over night. The reaction mixture is dissolved in 300 parts by volume of ethyl acetate and hydrogenated at room temperature and atmospheric pressure in the presence of 8 parts by weight of a palladium-on-barium sulfate catalyst until one mol of hydrogen has been absorbed. The catalyst is removed by filtration, the ethyl acetate is evaporated in vacuo and the residue heated to 190–200° C., at 16 mm. until the evolution of ethylene has ceased, and distilled in vacuo; 3,4-dicarbethoxy-2-furanbutanol is obtained, which boils at 156–161° C. at .02 mm.

A solution of 86.8 parts by weight of the above 3,4-dicarboxy-2-furan-butanol in 500 parts by volume of methanol and 250 parts by volume of 5-normal potassium hydroxide is refluxed for three hours. The methanol is removed in vacuo, the residue diluted with water and cooled in an ice-bath. Concentrated hydrochloric acid is added slowly with constant stirring until the mixture is acid to Congo red. After refrigeration over night, the crystals are collected, washed with ice water, and dried over phosphorus pentoxide in vacuo. The crude material is recrystallized from a mixture of methanol and ethylacetate; melting point 126–127° C.

To 57.5 parts by weight of 3,4-dicarboxy-2-furan-butanol in 235 parts by volume of dry pyridine are added slowly 150 parts by volume of acetic anhydride. After standing over night, the solvents are removed in vacuo, the residue is dissolved in ethyl acetate and the solution washed with 2-normal hydrochloric acid and water, and extracted with several portions of 10 per cent sodium bicarbonate. The combined bicarbonate extracts are acidified with concentrated hydrochloric acid to Congo red and the desired compound re-extracted with ethyl acetate. The combined ethyl acetate extracts are washed with water, dried over sodium sulfate, and the solvent removed in vacuo. The crystalline residue of 3,4-dicarboxy-2-furan-butanol acetate is repeatedly washed with petroleum ether (boiling point 30–60° C.) and dried over phosphorus pentoxide; 61.3 parts by weight of the substance are obtained.

The 2-furanbutanol used in this example is obtained as follows:

To a three-neck flask, equipped with a dropping funnel and a stirrer with a mercury seal, are added 300 parts by weight of 2-furanpropanol and 312 parts by weight of dimethyl aniline. The flask is cooled in an ice-salt-bath, and 306 parts by weight of thionyl chloride in 180 parts by volume of dry chloroform are added dropwise with stirring. The inside temperature is kept at 0–10° C. throughout the operation. After addition of the thionyl chloride the mixture is stirred for one hour, poured on crushed ice, and extracted with three 300 parts by volume portions of chloroform. The chloroform extracts are washed with six 250 parts by volume portions of 2-normal hydrochloric acid, two portions of water, six 250 parts by volume portions of 2-normal potassium carbonate, and dried over sodium sulfate. The solvent is removed in vacuo, and the residue on distillation yields 2-furanpropyl chloride as a colorless liquid which boils at 80–92° C. at 13 mm.

To a solution of 71 parts by weight of 2-furanpropyl chloride in 700 parts by volume of 95 per cent alcohol, 36 parts by weight of potassium cyanide dissolved in 75 parts by volume of water are added, and the mixture refluxed for 22 hours. The solution is concentrated to one-third of its volume, 215 parts by volume of 5-normal potassium hydroxide are added, and refluxing is continued for 9 hours. Most of the alcohol is removed by distillation and the remaining alkaline solution is extracted with ether to remove neutral substances. It is then acidified with 18-normal sulfuric acid to Congo red and again extracted with ether. The ether extracts are washed with water, dried over sodium sulfate, and the ether removed on the steam-bath. The residue, on distillation, yields 2-furanbutyric acid as a colorless liquid which boils at 94–117° C. at .03 mm.

A solution of 175 parts by weight of the last-named acid in 1500 parts by volume of absolute ethyl alcohol containing 40 parts by weight of dry HCl gas is allowed to stand at room temperature overnight. The alcohol is removed in vacuo, the residue is poured on cracked ice and the organic material extracted with ether. The ethereal solution is washed with water and 2-normal potassium carbonate, dried over sodium sulfate, and the ether evaporated. Distillation of the residue gives the desired ester as a colorless liquid which boils at 119–122° C. and 23 mm.

A solution of 30 parts by weight of ethyl-2-furanbutyrate and 20 parts by weight of phenol in 200 parts by volume of absolute alcohol is added rapidly to 60 parts by weight of sodium. Absolute alcohol (400 parts by volume) is added slowly, and the mixture is refluxed until all of the sodium has dissolved. The solution is cooled, 200 parts by volume of water are added and refluxing is continued for an additional hour. Most of the alcohol is then removed by steam distillation, and the aqueous residue is cooled and extracted with three portions of ether. The ether extracts of two such runs are combined, washed with water, dried over sodium sulfate, and the ether is removed on the steam-bath. Distillation of the residue yields 2-furanbutanol as a colorless liquid which boils at 115–117° C. at 18 mm.

*Example 3*

A mixture of 30.8 parts by weight of furyl-(2)-n-pentanol and 37.6 parts by weight of diethyl acetylene dicarboxylate is heated on the steambath for 6 hours, and the resulting viscous addition compound is dissolved in 200 parts by volume of ethyl acetate and hydrogenated in the presence of a palladium catalyst until 5700 parts by volume of hydrogen have been absorbed. The catalyst is removed by filtration and the partially hydrogenated material is decomposed into ethylene and 3,4-dicarbethoxy-furan-(2)-n-pentanol which is purified by distillation. Boiling point 174–175° C. at 0.01 mm.

1.5 parts by weight of the above 3,4-dicarbethoxy-furan-(2)-n-pentanol are refluxed for 3 hours with 4 parts by volume of 5-normal KOH and 8 parts by volume of methanol. The solution is then concentrated to a small volume in vacuo and acidified to Congo red with concentrated HCl. The resultant crude 3,4-dicarboxy-furan-(2)-n-pentanol is purified by crystallization from ethyl acetate and melts at 124–126° C.

By proceeding in a manner analogous to that set forth in the last paragraph of Example 1, the afore-obtained 3,4-dicarboxy-furan-(2)-n-pentanol can be converted to the corresponding acetate or other ester.

The furyl-(2)-n-pentanol used in this example is prepared as follows:

46.7 parts by weight of furyl-(2)-n-valeric acid are dissolved in 500 parts by volume of 4% absolute alcoholic HCl and the solution is kept at room temperature for 12 hours. The solution is then concentrated to a small volume in vacuo and the ester isolated in the usual manner. The ester is obtained as a colorless liquid which boils at 130–133° C. at 16 mm.

10 parts by weight of the above ethylester of furyl-(2)-n-valeric acid are dissolved in 100 parts by volume of absolute alcohol and this solution is rapidly added to 30 parts by weight of sodium. 200 parts by volume of absolute alcohol are gradually added and the mixture is heated on the steam-bath until all of the sodium is dissolved. The solution is cooled and the sodium ethylate is decomposed by the addition of 100 parts by volume of water. The strongly alkaline solution is refluxed for an additional hour and the alcohol is removed by steam distillation. The aqueous residue is extracted with ether, the ethereal solution is washed with water, dried over sodium sulfate and the ether is removed on the steam-bath. The residual viscous oil is then distilled in vacuo and yields furyl-(2)-n-pentanol boiling at 125–130° C. at 16 mm.

*Example 4*

20 parts by weight of 3,4-dicarbethoxy-furan-(2)-n-pentanol are dissolved in 200 parts by volume of ethyl alcohol and are hydrogenated over a Raney nickel catalyst at an initial pressure of 1900 pounds and a temperature of 170–180° C. for 3 hours. The catalyst is filtered off and the alcohol removed in vacuo. The oily residue is dissolved in ether, washed with 2-normal sodium carbonate and water and dried over sodium sulfate. The ether is removed on the steam-bath and the residue distilled in vacuo. The hydrogenated esters boil at 175–180° C. at 0.02 mm. and have the following constants: $d^{21}=1.102$; $n_D^{24}=1.4660$.

*Example 5*

10 parts by weight of 3,4-dicarboxy-furan-(2)-n-pentanol are dissolved in 100 parts by volume of glacial acetic acid and are hydrogenated in the presence of a palladium catalyst at 100 pounds initial pressure and a temperature of 100–150° C. for several hours. The catalyst is removed by filtration and the glacial acetic acid is removed in vacuo. The residue is dissolved in 20 parts by volume of 1-normal KOH and is kept at room temperature for 12 hours. The solution is then acidified to Congo red with concentrated hydrochloric acid and the reduced acids are isolated by ether extraction. The acids are esterified with 100 parts by volume of 5% ethanolic HCl and the esters are distilled in vacuo. Boiling point 168–170° C. at 0.02 mm.

Having thus disclosed the invention, what is claimed is:

1. A compound of the formula

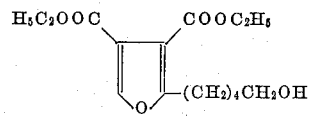

wherein R stands for a member of the group consisting of free and esterified lower alkanol groups, R' stands for a member of the group consisting of hydrogen, alkyl, aryl and aralkyl, and X is a nucleus of the group consisting of the furan and tetrahydrofuran nuclei, the R'OOC— radicals being attached in the 3,4-positions and the R-group in the 2-position of the said nucleus.

2. A compound of the formula

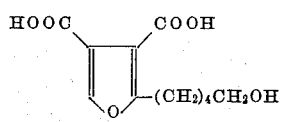

3. A compound of the formula

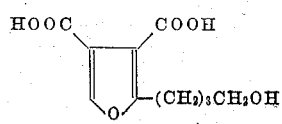

4. A compound of the formula

HOOC  COOH
  \\  //
   \\//
    ||
    O—(CH₂)₃CH₂OH

5. In a process for the preparation of a compound of the formula

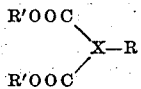

wherein R stands for a member of the group consisting of free and esterified lower alkanol groups, R' stands for a member of the group consisting of hydrogen, alkyl, aryl and aralkyl, and X is a nucleus of the group consisting of the furan and tetrahydrofuran nuclei, the R'OOC— radicals being attached in the 3,4-positions and the R-group in the 2-position of the said nucleus, the steps of reacting a compound of the formula

wherein R has the precedingly-recited significance, with an acetylene dicarboxylic acid ester, partially hydrogenating the reaction product, and heating the resultant partially hydrogenated product to decompose the same into ethylene and the corresponding 3-COOR'-4-COOR'-furan-(2)-R compound, and recovering the latter, R and R' having in the last-named compound the precedingly-recited significances.

6. A process for the preparation of a compound of the formula

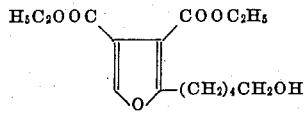

which comprises the steps of reacting furyl-(2)-n-pentanol with diethyl acetylene dicarboxylate, partially hydrogenating the reaction product, heating the resultant partially hydrogenated product to decompose the same into ethylene and 3,4-dicarbethoxy-furan-(2)-n-pentanol, and recovering the latter.

7. A process for the preparation of a compound of the formula

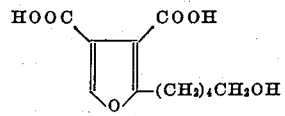

which comprises the steps of reacting furyl-(2)-n-pentanol with diethyl acetylene dicarboxylate, partially hydrogenating the reaction product, heating the resultant partially hydrogenated product to decompose the same into ethylene and 3,4-dicarbethoxy-furan-(2)-n-pentanol, recovering the latter and converting the same into the corresponding 3,4-dicarboxy compound with the aid of a hydrolyzing agent.

8. A process for the preparation of a compound of the formula

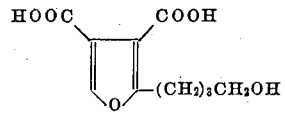

which comprises the steps of reacting 2-furanbutanol with diethyl acetylene dicarboxylate, partially hydrogenating the reaction product, heating the resultant partially hydrogenated product to decompose the same into ethylene and 3,4-dicarbethoxy-2-furanbutanol, recovering the latter and converting the same into the corresponding 3,4-dicarboxy compound with the aid of a hydrolyzing agent.

KLAUS HOFMANN.

REFERENCES CITED

The following references are of record in the file of this patent:

UNITED STATES PATENTS

| Number | Name | Date |
|---|---|---|
| 2,382,418 | Hoffman | Aug. 14, 1945 |

OTHER REFERENCES

Richter, "Textbook of Organic Chemistry," p. 125, John Wiley & Sons. Inc., New York, 1938.

Certificate of Correction

Patent No. 2,527,421                                                    October 24, 1950

KLAUS HOFMANN

It is hereby certified that error appears in the printed specification of the above numbered patent requiring correction as follows:

Column 2, lines 3 to 5, inclusive, Formula III, for that portion reading column 5, line 30, for "acetlylene" read *acetylene*;

and that the said Letters Patent should be read as corrected above, so that the same may conform to the record of the case in the Patent Office.

Signed and sealed this 26th day of December, A. D. 1950.

[SEAL]

THOMAS F. MURPHY,
*Assistant Commissioner of Patents.*